United States Patent [19]
Bintzler et al.

[11] Patent Number: 5,991,952
[45] Date of Patent: Nov. 30, 1999

[54] RAILROAD CAR WHEEL CLEANING SYSTEM

[76] Inventors: Robert R. Bintzler, 7936 Shelldale Way, Cincinnati, Ohio 45242; John Gregory Bintzler, 9570 State Rt. 48, Loveland, Ohio 45140

[21] Appl. No.: 09/031,084

[22] Filed: Feb. 26, 1998

[51] Int. Cl.⁶ .................................. B60S 3/04; B60S 3/06
[52] U.S. Cl. .............................. 15/53.4; 15/88.3; 104/307
[58] Field of Search .................................. 15/21.1, 53.4, 15/54, 55, 88.2, 88.3; 104/307

[56] References Cited

U.S. PATENT DOCUMENTS

| | | | |
|---|---|---|---|
| 2,712,320 | 7/1955 | Schroeder et al. | 15/53.4 |
| 4,088,078 | 5/1978 | Noble | 104/307 |
| 5,123,136 | 6/1992 | Belanger et al. | 15/53.4 |
| 5,127,123 | 7/1992 | Belanger | 15/53.4 |

FOREIGN PATENT DOCUMENTS

| | | | |
|---|---|---|---|
| 1158415 | 5/1985 | U.S.S.R. | 15/53.4 |

*Primary Examiner*—Terrence R. Till
*Attorney, Agent, or Firm*—Wood, Herron & Evans, LLP

[57] ABSTRACT

A system for cleaning the wheels of railcars as the railcars move along the rails of a railroad track comprises chairs supporting a track rail holding a frame. A movable brush plate is movably mounted on the frame and carries a brush mechanism mounted for moving with the brush plate toward and away from the rail to clean railcar wheels moving along the rail. A linkage system is operably coupled between said brush plate and said frame for moving the plate and brush mechanism. The linkage system includes two actuator arms pivotally mounted to move in opposite directions to direct the brush plate toward the rail when an actuating mechanism is operated. The brushes of the brush mechanism are coupled together by a solid coupling sleeve for easy and inexpensive maintenance. A motor is coupled to the brushes through a coupler which is uniquely shaped to reduce damage during use.

15 Claims, 7 Drawing Sheets

5,991,952

RAILROAD CAR WHEEL CLEANING SYSTEM

FIELD OF THE INVENTION

This invention is related generally to railroad car cleaning and, more specifically, to a system for cleaning railroad car wheels as they pass along the rails so that the rail cars may be properly handled in a rail yard.

BACKGROUND OF THE INVENTION

Despite the ever-increasing use of the interstate highway system to ship products, shipment of products by rail is still a very viable alternative. Various different products are delivered across the country in railcars, including livestock, automobiles, food products, liquids, fuel, and a myriad of other products. In fact, truck trailers are often shipped by rail to a destination and are then driven from there to their final delivery point.

During shipment, the railcars containing the shipped goods are often engaged and disengaged with various other groups of railcars and engines, depending upon the ultimate destination for the goods in those railcars. Just as airlines have hubs or centers where incoming and outgoing flights are coordinated, railroads have large rail yard centers or "humps" for arranging railcars into lines which are linked with one or more engines. At the rail yard humps, individual railcars or groups of railcars are disengaged from their current line or engine(s) and are then engaged with new lines and engine(s). For such engagement and disengagement in the rail yard, the railcars must be slowed down or retarded substantially from their travel speed, as will be appreciated. The railcars must be slowed properly so that they can be safely and efficiently engaged with other cars and engines without derailing.

To slow a railcar, rail yards have devices called retarders which are located proximate the two parallel rails of the track. The retarders are operable for engaging the wheels of the railcars as they pass to slow the railcars' forward progression. More specifically, the retarders frictionally engage the wheels by squeezing them as the cars pass the retarder. For example, a retarder would squeeze the wheels of a railcar and reduce the speed of the railcar from approximately 18 miles per hour (mph) to 3 mph so that the railcars may be more easily and safely manipulated for subsequent hookups with other lines and/or engines.

As may be appreciated, suitable friction between the retarder and the railcar wheels must exist for the retarder to function properly. Any factor reducing the friction between the retarder and the railcar wheels will reduce the retarder's effectiveness. That is, the railcar wheels will fail to be sufficiently slowed as they pass through the retarder and the railcar will travel more quickly in the yard than is desired. Not only will a fast railcar be more difficult to control and hook up, but it will also be dangerous for the rail yard workers.

Inevitably, substances get onto the wheels of railcars which reduce the friction between the wheels and the retarder and thus reduce the effectiveness of the retarder. The contaminating substances may be picked up by the wheels during transit or in the rail yard. Very often, such contaminating substances are actually the contents of the railcar, such as a tank car or boxcar. For example, syrup, oils, or other substances shipped in the cars will leak onto the car's wheels. When such contamination of the wheels occurs, the proper slowing of the cars is hindered.

Dirty or contaminated railcar wheels increase the possibility of derailment in the yard. The momentum of a speeding car, which may weigh 290,000 lbs. is tremendous. If the car is not properly slowed, it will slam into other cars on the track causing derailment, or alternatively, it will eventually slam into a rail stop on the hump track.

Accordingly, it is desirable to keep railcar wheels as clean as possible, particularly in the rail yard humps where they must be manipulated. To handle the task of keeping railcar wheels clean, a railcar wheel cleaning system was developed and made commercially available by Bintzler, Inc. of Loveland, Ohio. The original Bintzler system utilizes two opposing sets of brushes, with one set positioned on either side of each of the parallel track rails. In use, the brushes rotate proximate the rails and engage the wheels as they pass the cleaning system. Before the Bintzler system, wheel cleaning was not done at all.

While the original Bintzler system provided significantly improved cleaning of the wheels over the prior art methods, the harsh environment of a rail yard needed to be further addressed. It will be readily recognized that any rail yard equipment must be able to handle a large amount of abuse associated with the large, heavy railcars.

Furthermore, installation issues present further problems. Rail yard workers, as is suitable for their environment, are notoriously hard and rough on the equipment they handle. While heavy railcars and rails are made for such punishment, harsh treatment and improper or sloppy installation of the wheel cleaning system will shorten its effective life and increase the need for and frequency of repairs. The inventors have discovered that in the fast-paced and rough environment of a rail yard, proper attention is not paid to installation and operation of the wheel cleaning system. Any installation steps requiring precision on behalf of the installer are generally overlooked. As such, the original wheel cleaning systems are often not properly installed and are subject to misalignment and improper wear.

Still further, maintenance of the original cleaning system has been somewhat difficult. The railcar wheel cleaning systems are installed on rail lines and usually are left exposed to the elements. As such, due to wear and exposure, various elements of the devices, and particularly the brushes, must be periodically replaced. The original wheel cleaning system has proved somewhat difficult to maintain, requiring additional expensive replacement parts to be purchased for repair, when only one part of the device may actually need replacement.

Additionally, the wheel cleaning system must operate so that all of its elements are free of the rails when the brushes are not engaging the wheels for cleaning. As will be appreciated, the force and momentum of railcar wheels are tremendous and will generally destroy any equipment or part thereof in their path. The original cleaning systems, either through improper installation or subsequent misalignment through usage, have been susceptible to damage from parts thereof exposed to the moving rail wheels.

Still further, the original wheel cleaning systems have sometimes proven to be difficult to properly install and adjust due to the various different conditions along a rail. For example, it is desirable to ensure proper positioning of cleaning brushes once the device is installed. If the brushes are too far away, the wheels are not properly cleaned. If too close, the brushes will wear out prematurely or be damaged by the moving wheels. Positioning and alignment must also be maintained after use of the system for a period of time to ensure proper cleaning.

The cleaning system for cleaning rail car wheels is further limited by railroad track considerations. While engaging the wheels, the components of the system cannot extend over three inches above the top surface of the rails. Portions of the engines, including the cattle catchers on the front thereof, will damage and destroy components higher than 3 inches above the rails.

Accordingly, it is an objective of the present invention to improve upon the existing railcar wheel cleaning technology and to overcome the drawbacks discussed above, and other drawbacks to the original cleaning system and existing technology.

It is another objective of the present invention to efficiently and suitably clean the wheels of a passing railcar so that a retarder may properly slow the railcar down.

It is still another objective of the invention to be able to withstand the harsh and damaging environment of a rail yard while cleaning the wheels of a railcar.

It is still another objective for a cleaning system to be easily and efficiently installed without the need for precise steps and measurements by the installer.

It is an objective of the invention to present a cleaning system which is easily and inexpensively maintained.

It is still another objective to provide a durable wheel cleaning system which does not obstruct the passing railcar wheels or railcar, and is less susceptible to being damaged by the wheels or railcar.

It is still another objective to provide precise positioning and alignment of the components of the system with respect to the wheels to be cleaned thereby.

SUMMARY OF THE INVENTION

The present invention addresses the above objectives and other objectives and provides a railcar wheel cleaning system which efficiently cleans railcar wheels while withstanding the harsh and damaging environment of a rail yard. The system further is easily and efficiently installed and inexpensively maintained. Easy and precise positioning of the alignment of the components of the system is provided such that the inventive system does not obstruct passing railcar wheels and is less susceptible to damage and wear.

In accordance with one aspect of the present invention, the system includes a chair for supporting a track rail having a stationary frame mounted thereto. A movable brush plate includes rollers and is mounted to move back and forth on the stationary frame toward and away from the track rail. A brush mechanism mounted on the movable brush plate cleans the railcar wheels. A linkage system is operably coupled between the frame and the chair for moving the brush plate and brush mechanism with respect to the rail. The linkage system comprises a first actuator arm pivotally mounted with respect to the chair and coupled to the movable frame plate. The first actuator arm is operable for pivoting in the first direction and directing the brush plate and brush toward the rail. A second actuator arm is also pivotally mounted with respect to the chair and is coupled to the movable brush plate. The second actuator arm is operable for pivoting in the second direction opposite to the first direction to direct the brush plate and brush toward the rail. An actuating mechanism simultaneously pivots both the actuator arms so that the arms simultaneously direct the brush mechanism toward the rail to clean the wheels thereon. The generally equal and opposite forces provided by the first and second actuator arms reduces shifting of the brush mechanism and system components in a direction other than toward or away from the track rail. That is, the directing force of the linkage system is directed toward and away from the rail as is desired, such that undesired wear from side motion is reduced.

In accordance with another aspect of the present invention, the actuating mechanism includes a stroke clevis for adjusting the actuation stroke of the actuating mechanism. The stroke clevis includes an adjustable bolt which determines the stroke length of the actuating mechanism to thereby adjust and control the movement of the brush plate and brush mechanism toward and away from the rail. In that way, the present invention may be easily and efficiently adjusted to compensate for any wear in the brush mechanism and to provide proper cleaning of the railcar wheels.

In a preferred embodiment of the invention, the linkage system comprises a pivot arm which is operably coupled to an actuating mechanism operating on pressurized air or electric power. Linkage arms couple the single pivot arm to both of the actuator arms for simultaneous pivoting of the actuator arms when the actuating mechanism is operated. For proper operation of the system and efficient cleaning, the stationary frame includes cross members with adjustment slots for adjusting the position of the stationary frame with respect to the chairs supporting the track rail. In that way, the system may be quickly and properly aligned with the rails to properly clean the wheels and reduce unnecessary wear of the brush mechanism and other components of the system. The brush plate also includes guides which are adjustable for adjusting the position and movement of the brush mechanism. The combination of the adjustable frame, adjustable brush plate guides and stroke clevis ensure proper cleaning of the railcar wheels and reduce unnecessary wear and damage to the cleaning system.

In accordance with another aspect of the present invention, the brush mechanism comprises a plurality or set of brushes with at least two elongated brushes on each side of the rail. The brushes are oriented generally end to end and are rotatable on an axis generally parallel to the track rail. The brushes are coupled together by a sleeve having a center bore therethrough. Abutting ends of the brushes have splines and the sleeve includes cooperating splines for engaging the brushes and splines for coupling the brushes together. Each of the abutting brush ends are removable from the sleeve independently from the other for replacement of individual brushes in the brush mechanism when desired. In that way, all the brushes of the mechanism on one side of the rail do not have to be replaced when it is desirable to replace a single brush. A substantial savings in maintenance costs results. A center bearing is mounted to receive the sleeve for rotation of the brushes.

Each brush set on the side of a rail is driven by a drive mechanism. Driving one end of one of the brushes is sufficient for driving the entire set, as each brush of the set is coupled to the adjacent brush by a splined sleeve.

The drive mechanism of the invention includes a motor which rotates a drive shaft. The drive shaft is coupled to a driven shaft, and the rotating driven shaft is, in turn, coupled to the brush mechanism through a gear reducer/coupler. To prevent the need for precise alignment between the drive and driven shafts, and to reduce undesired wear to the drive shaft and the driven shaft, the invention comprises a solid coupling sleeve engaging adjacent ends of the drive shaft and driven shaft. The sleeve includes a plurality of keys which are received in respective slots of both the driven shaft and drive shaft to secure the shafts together for simultaneous rotation. The motor, drive shaft, and driven shaft of the drive mechanism are mounted generally in line and perpendicular to the track rail and brushes. The gear reducer/coupler provides 90° coupling and gear reduction between the brush mechanism and driven shaft for proper rotation of the brushes. The coupler is oriented generally in line with the rotational axes of the brushes which have an outer diameter sufficient to engage a railcar wheel when the brush mechanism is moved toward the rail.

In accordance with another aspect of the present invention, the coupler includes a housing having a side wall facing the rail when the brushes move toward the rail. The side wall is curved and has an effective radius less than the brush radius. In that way, the coupler does not interfere with the wheel being cleaned when the brushes are moved to engage the wheel. Furthermore, the components of the drive mechanism are less susceptible to being damaged by a railcar wheel or portion of a railcar passing the cleaning system on the track. Still further, the system maintains dimensions above the track of less than 3".

BRIEF DESCRIPTION OF THE FIGURES

The accompanying drawings, which are incorporated in and constitute a part of this specification, illustrate embodiments of the invention and, together with a general description of the invention given below, serve to explain the principles of the invention.

DETAILED DESCRIPTION OF THE INVENTION

Figure 1:
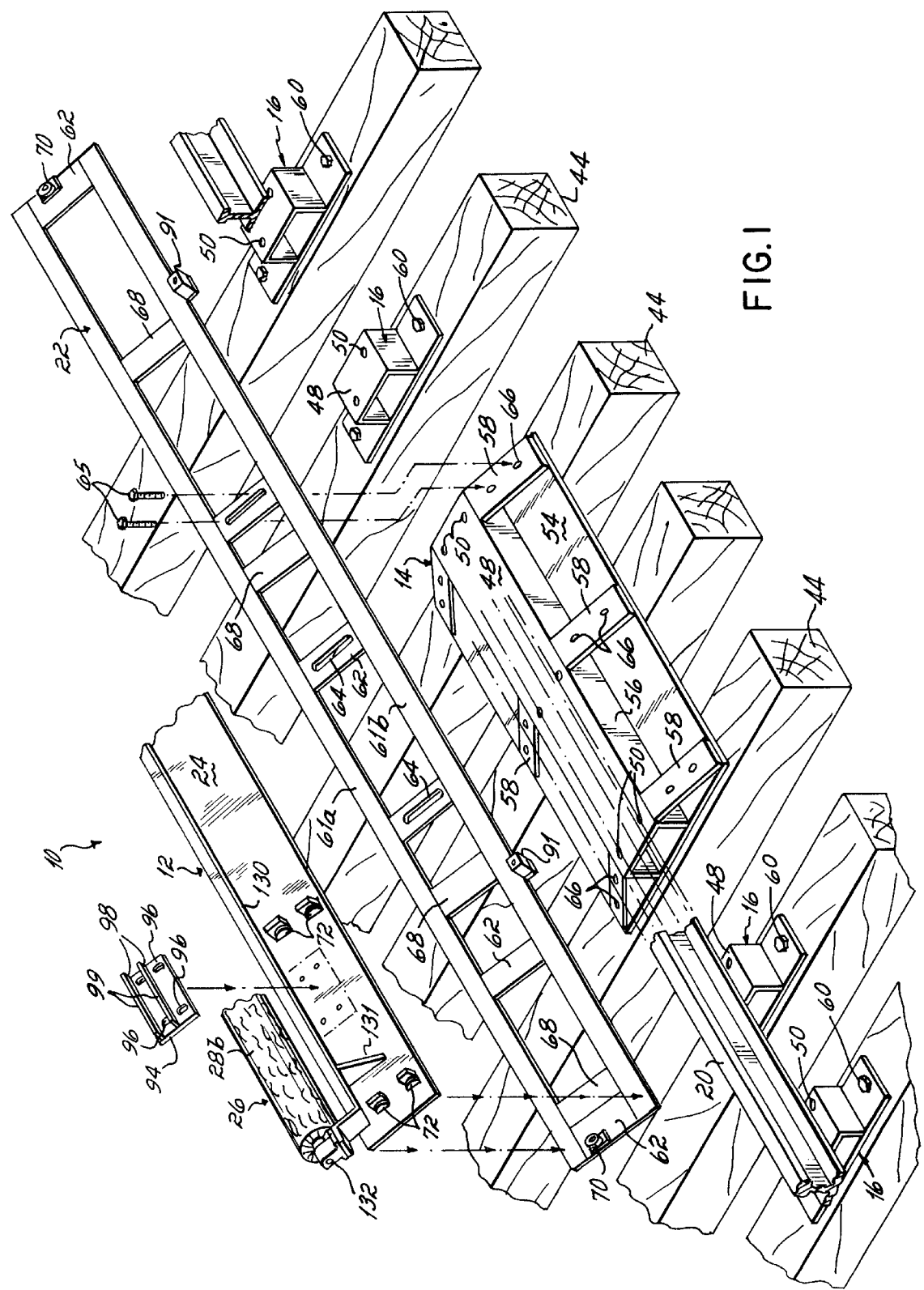
FIG. 1 is an exploded, perspective view of a portion of the cleaning system shown positioned proximate a rail.
Figure 4:
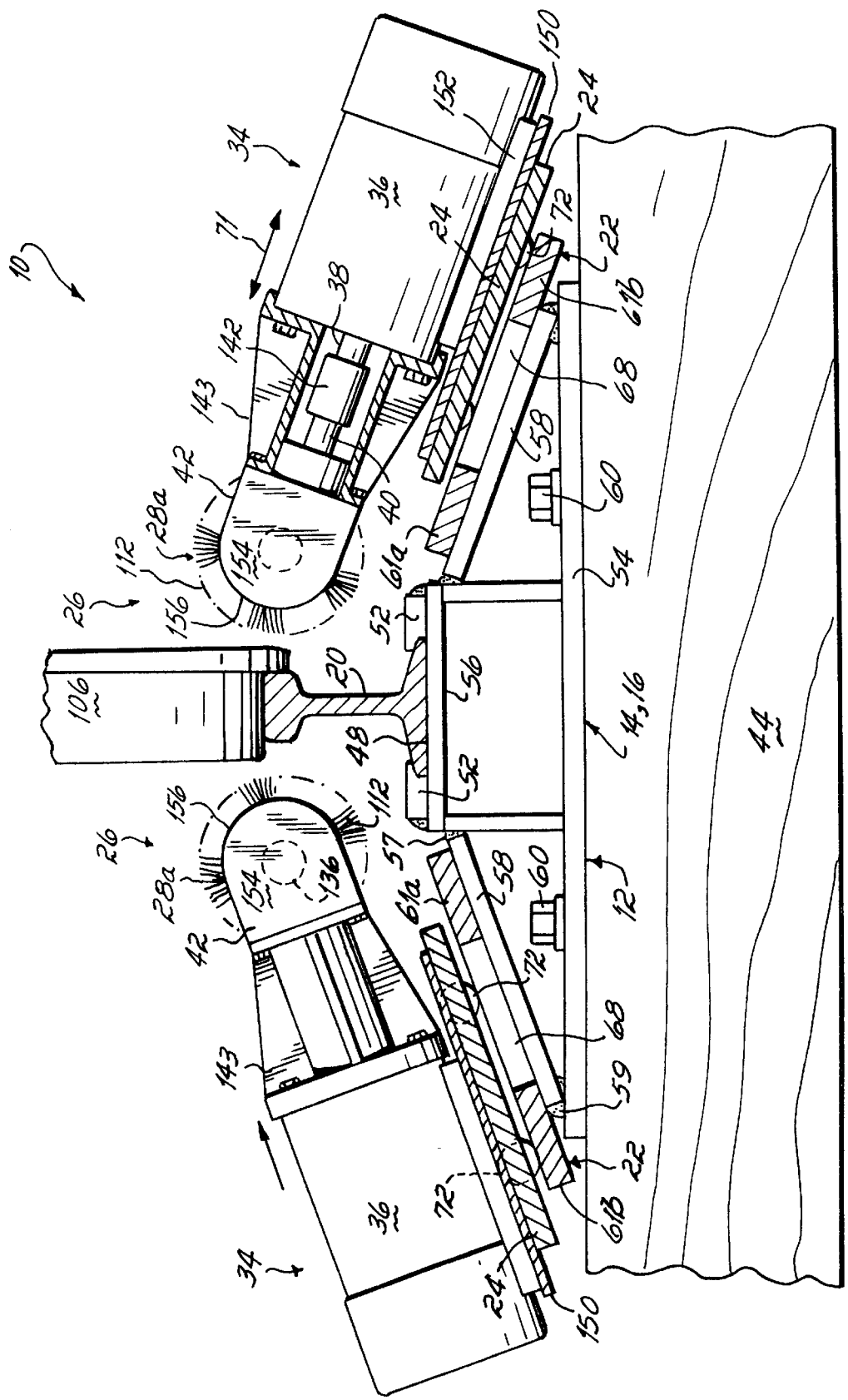
FIG. 4 is a cross-sectional view along lines 4—4 of FIG. 3.

The improved wheel cleaning system 10 of the present invention comprises a plurality of separate sub-systems, mechanisms, and components which are operably engaged and intercoupled to provide for proper operation of the overall cleaning system. More specifically, the overall inventive cleaning system 10 includes a frame system 12 comprising a large railchair 14 and smaller railchairs 16 on either side of the large railchair. Referring to FIG. 1, the frame system 12 is shown disassembled for a rail 20 on one side of a railroad track. Since both sides of each wheel passing over each of two track rails 20 is cleaned by the system, various parts of the frame system 12 are duplicated on each side of the rail, as illustrated in FIG. 4. That is, a similar frame system is positioned on the other side of the rail 20. Furthermore, the overall cooperating frame systems 12 for each rail are duplicated for the other parallel rail (not shown in FIG. 1), making up the railroad track, as will be discussed in greater detail hereinbelow.

The rail 20 rests on the chairs 14,16 which, in turn, rest on the railroad ties 44. The rail 20 is thus elevated above the ties 44 and system 10. Mounted on the chair 14 is a stationary frame 22 and a moveable brush plate 24 which moves thereon toward and away from rail 20 for cleaning wheels rolling on the rail. The frame 22 is only mounted to chair 14, but extends over and is supported by chair 16. When heavy railcars move along a track, the ties move up and down and the track flexes. To address the flexing of the track, the frame 22 is loosely supported by chairs 16 at either end so that the frame may also flex without being permanently bent or distorted. Chair 14, on the other hand, maintains the frame in position.

Figure 2:
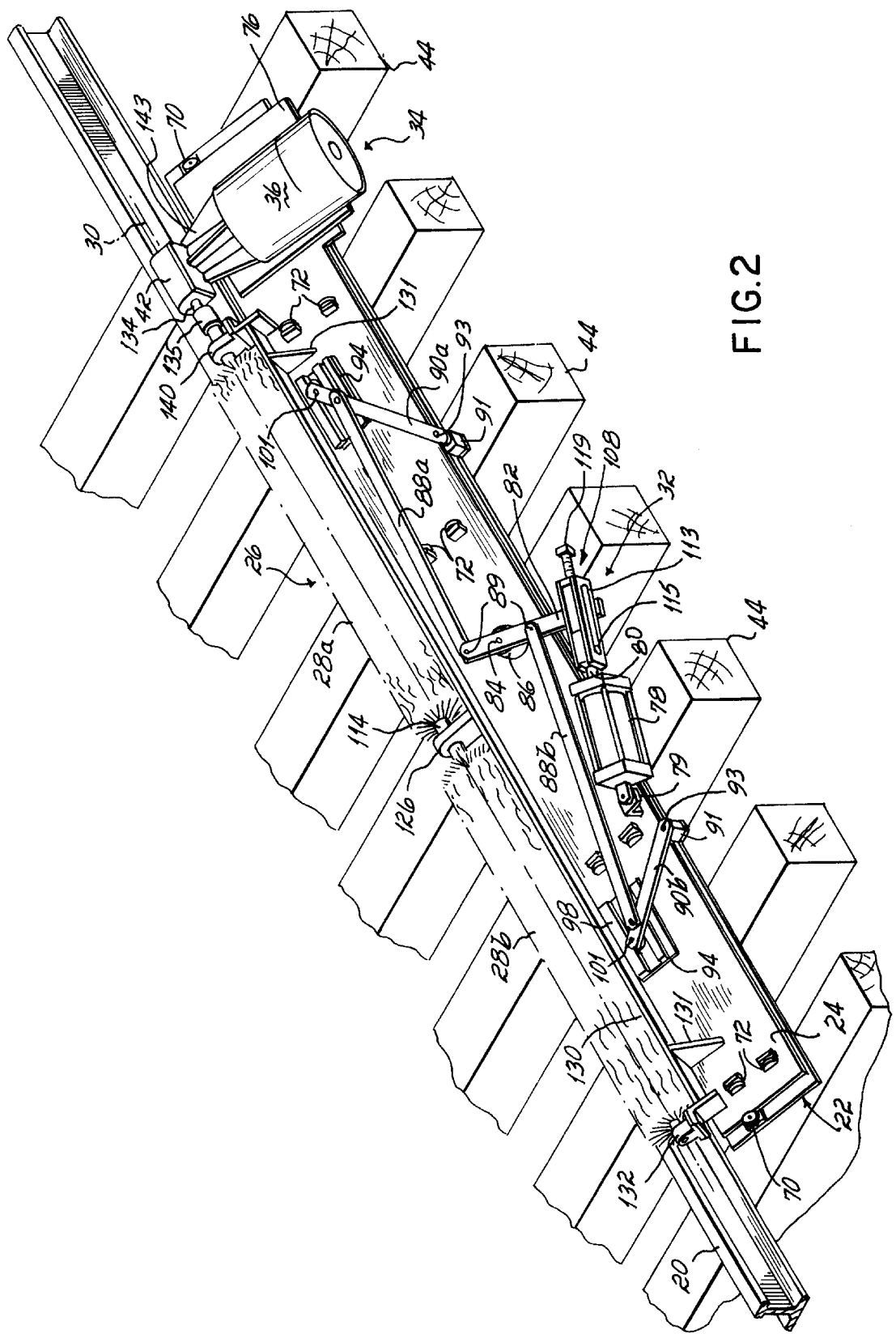
FIG. 2 is a perspective assembled view of the system proximate a rail.

Coupled with the frame system 12 is a brush mechanism 26 including a plurality of elongated rotating brushes 28a, 28b (see FIG. 2). The elongated brushes 28a, 28b have their longitudinal axis illustrated by reference numeral 30 oriented generally parallel to the track rail 24 for efficient cleaning of wheels passing along the rail 20. The brush mechanism 26 is operably coupled to the moveable brush plate 24 for moving with the plate toward and away from rail 20.

To provide movement of the moveable brush plate 24 and brush mechanism 26, the railcar wheel cleaning system 10 includes a linkage system 32 (see FIG. 2) which is coupled between the stationary frame 22 and the moveable brush plate 24. When the linkage system 32 is actuated, brush plate 24 is moved with respect to frame 22, and the chairs 14, 16. The brush mechanism 26 is thereby moved toward rail 20. As discussed further hereinbelow, the linkage system 32 provides a unique balanced movement of the moveable brush plate 24 to prevent shifting and misalignment of the entire system 10.

For driving the brush mechanism 26, the railcar wheel cleaning system 10 includes a drive mechanism 34 (see FIGS. 2, 3, 4, and 5) which is operable for rotating the brushes 28a, 28b. Drive mechanism 34 includes a motor 36 and a series of shafts 38, 40 with a gear reducer/coupler 42 for coupling the motor 36 to brush mechanism 26 and specifically to an end of one of the brushes. In accordance with one aspect of the present invention, the drive mechanism remains clear of rail 20 in the disengaged and engaged position, and thus does not interfere with a passing railcar or the passage of railcar wheels on the rail. Accordingly, the wheels and any other elements of a railcar, such as a cowcatcher on the front of an engine, will not strike, and therefore damage, a portion of the drive mechanism and thus render the system 10 inoperable.

Each of the unique sub-systems and mechanisms of inventive system 10 cooperate to provide a railcar wheel cleaning system which improves upon the original system and efficiently cleans railcar wheels as they pass thereby. Furthermore, system 10 of the present invention is rugged and durable and may be easily installed and maintained in the harsh environment of a railroad yard. Each of the individual mechanisms and systems and their operation and cooperation are described in greater detail hereinbelow.

Frame System

Frame system 12, as illustrated more specifically in FIGS. 1, 2, 4, and 5, provides a structure for supporting a track rail 20 proximate the other various systems and mechanisms of the railcar wheel cleaning system 10 so that the wheels are efficiently and properly cleaned as they travel along the rail and through and past the system 10. To that end, a portion of the track rail 20 is elevated so that the brush mechanism 26 may properly engage the wheels on rail.

Referring to FIG. 1, frame system 12 first includes the plurality of chairs 14,16 which are positioned on traditional railroad ties 44 for elevating the rail 20 on the ties. The chairs include a large triple chair 14 which extends across three railroad ties 44, and four individual chairs 16, two on either side of the triple chair 14, and mounted on individual railroad ties 44. The chairs are made of steel plates which are welded together and are fixed to the individual ties 44 by appropriate fasteners such as bolts 60 (see FIG. 4). Each of the chairs 14, 16 are box-like and have center portions with a generally rectangular cross-section for creating a flat top surface 48 to support the rail 20. The top surfaces 48 of all the chairs cooperate to properly elevate and support rail 20 thereon. For securing rail 20 to the chairs 14, 16 and specifically to the surfaces 48, appropriate holes or openings 50 are formed in surface 48 for securing clips 52 (see FIGS. 4 and 5) such as with bolts or other appropriate fasteners (not shown). The clips 52 hold the rail 20 in position on the chairs 14, 16 similar to the way in which the rail would normally be held to the railroad ties 44. The clips 52 are formed of steel of suitable strength for holding the rail 20 to the chairs 14, 16. Each of the two rails of a railroad track will be supported by a set of chairs 14, 16. FIG. 1 illustrates a single set of chairs for one track. A similar set of chairs 14, 16 would be duplicated for the other rail of the track.

The large rail chair 14, referred to as a triple rail chair because it occupies three railroad ties, includes a base plate 54 supporting the elevated platform plate 56 which is preferably 7 inches above the base plate. Mounting ramp plates 58, for mounting the stationary frame 22, are positioned on either side of platform plate 56 and are coupled to the platform plate by welds 59. A similar weld 61 couples a lower end of the ramp plate 58 to base plate 54 (see FIG. 4.). Referring to FIG. 1, chair 14 includes three ramp plates 58 on either side, one ramp plate for each of the railroad ties 44a, 44b, and 44c. The ramp plates 58 are positioned on both sides of platform plate 56. The base plate 54 spans between the ties 44 to provide a secure base for the system 10 and specifically for the frame plates 22, 24. The base plate 54, platform plate 56, and ramp plates 58 are preferably formed by steel plates having a thickness of approximately ¾". The smaller individual chairs 16 do not include ramp plates because the frame is not mounted thereto, but merely utilize a similar base plate 54 and platform plate 56 as the large rail chair 14. The respective platform plates 56 of the chairs define the top surface 48 for supporting a rail 20. Each of the chairs includes appropriate apertures in the base plates so that the chair may be fastened to the particular railroad tie, such as with the bolts 60.

Stationary frame 22 is fixedly mounted to the triple rail chair 14 and specifically to the three ramp plates 58 on either side of the rail chair 14. Referring to FIG. 1, the stationary frame 22 is formed by two flat, elongated members 61a, 61b which, in the preferred embodiment shown in FIG. 1, stretch across seven of the rail ties 44 and all of the chairs 14, 16. The elongated members 61a, 61b are also preferably formed of steel plates having a thickness of approximately 1¼". Spanning between the elongated members 61a, 61b, in a ladder formation as illustrated in FIG. 1, are cross members 62, 68 which couple the elongated members together. The cross members 62, 68 are welded to the elongated members to form the stationary frame 22. In the preferred embodiment of the invention, there is preferably a cross member 62 for each of the railroad ties 44 over which the frame plate 22 spans. Additional cross members 68 provide roller surfaces for the movable brush plate 24 as discussed further below.

For coupling frame 22 to the mounting ramp plates 58 of chair 14, three of the center cross members of the frame have alignment slots 64 formed therein. Appropriate fasteners, such as bolts, extend through the slots 64 and into appropriate holes or apertures 66 in the mounting ramp plates 58 to secure the frame 22 to the chair 14.

In accordance with one aspect of the present invention, the alignment slots 64 provide for spatial adjustment and alignment of the frame 22 on the chairs 14 so that the brush mechanism 26 on both sides of the rail may be adjusted for proper alignment with the rail. As will be appreciated, if the brush mechanism 26 is too close to the rail, it may interfere with the rail car wheels and will be prone to the premature wearing of the individual rotating brushes 28a, 28b. This increases maintenance costs. Furthermore, the brush mechanism 26 will be susceptible to damage from portions of the passing train, such as the wheel flange. Therefore, the alignment slots 64 of the stationary frame plate 22 provide for proper alignment of the overall cleaning system 10 with the rails 20. As mentioned, in addition to the cross members 62 associated with each of the chairs 14, 16, stationary frame 22 also includes cross members 68 utilized to provide a surface for rollers on the movable brush plate 24 discussed further hereinbelow. The cross members 68 provide a surface on which the movable brush plate rollers can move to provide movement of the brush plate 24 and thus movement of the brush mechanism against the wheels of the rail car.

Figure 5:
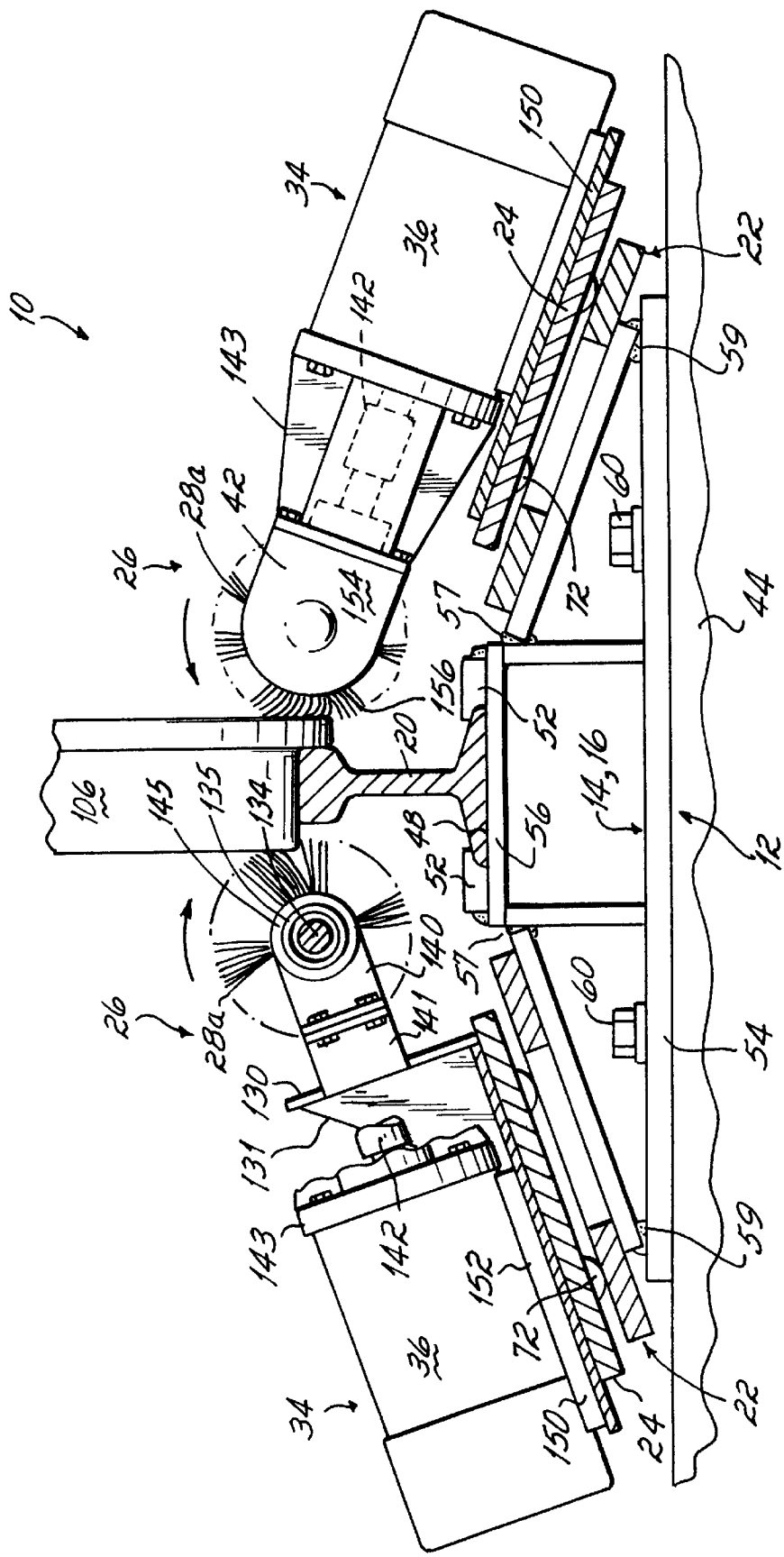
FIG. 5 is a cross-sectional view similar to FIG. 4 showing the brushes engaging a railcar wheel.

Movably mounted on stationary frame plate 22 is the movable brush plate 24 which is preferably formed of a solid plate of steel, of 1" thickness, as illustrated in FIG. 1. Referring to FIG. 2, the movable brush plate is slightly shorter (such as around 3") than the stationary frame 22. On each end of the stationary frame, a guide roller 70 is mounted to provide containment of the movable brush plate 24 at either end of the stationary frame 22. The guide rollers 70 only allow forward and backward movement of the brush plate 24 against and away from the rail 20, as illustrated in FIGS. 4 and 5 by reference arrow 71. In that way, movement of the brush plate to the side is prevented and the movement is confined in a direction toward and away from the wheels, as illustrated by reference arrow 71.

To provide for the smooth movement of the brush plate 24 on frame 22, pairs of rollers 72 are rotationally mounted on plate 24 and are positioned at points along the length of plate 24. In one embodiment, four pairs of rollers are used along the length of plate 24. The rollers 72 extend through appropriately formed and aligned openings in the plate 24. Preferably, the rollers are V-shaped at their outer rolling or guide surfaces (see FIG. 3). V-shaped rollers from Bintzler, Inc. of Loveland, Ohio, are suitable rollers for the plate 24. Rollers 72 are mounted on plate 24 to engage the cross members 68 on the stationary frame 22 to roll thereon and provide smooth movement of plate 24 with respect to stationary frame 22. As mentioned, in one embodiment of the invention, as illustrated in the figures, four pairs of rollers are spaced along the length of the movable brush plate 24 and the cross members 68 are appropriately positioned on frame 22 to provide for proper movement. Plate 24 is mounted flat on frame 22 and moves generally parallel to the plane of frame 22. When the linkage system 32 is actuated, the plate 24 is driven to roll along frame 22 to move the brush mechanism 26 toward and away from rail 20. Preferably, the width of plate 24 is 3" narrower than that of frame 22. This width allows for the movement of brush plate 24 toward and away from the rail.

Linkage System

Figure 3:
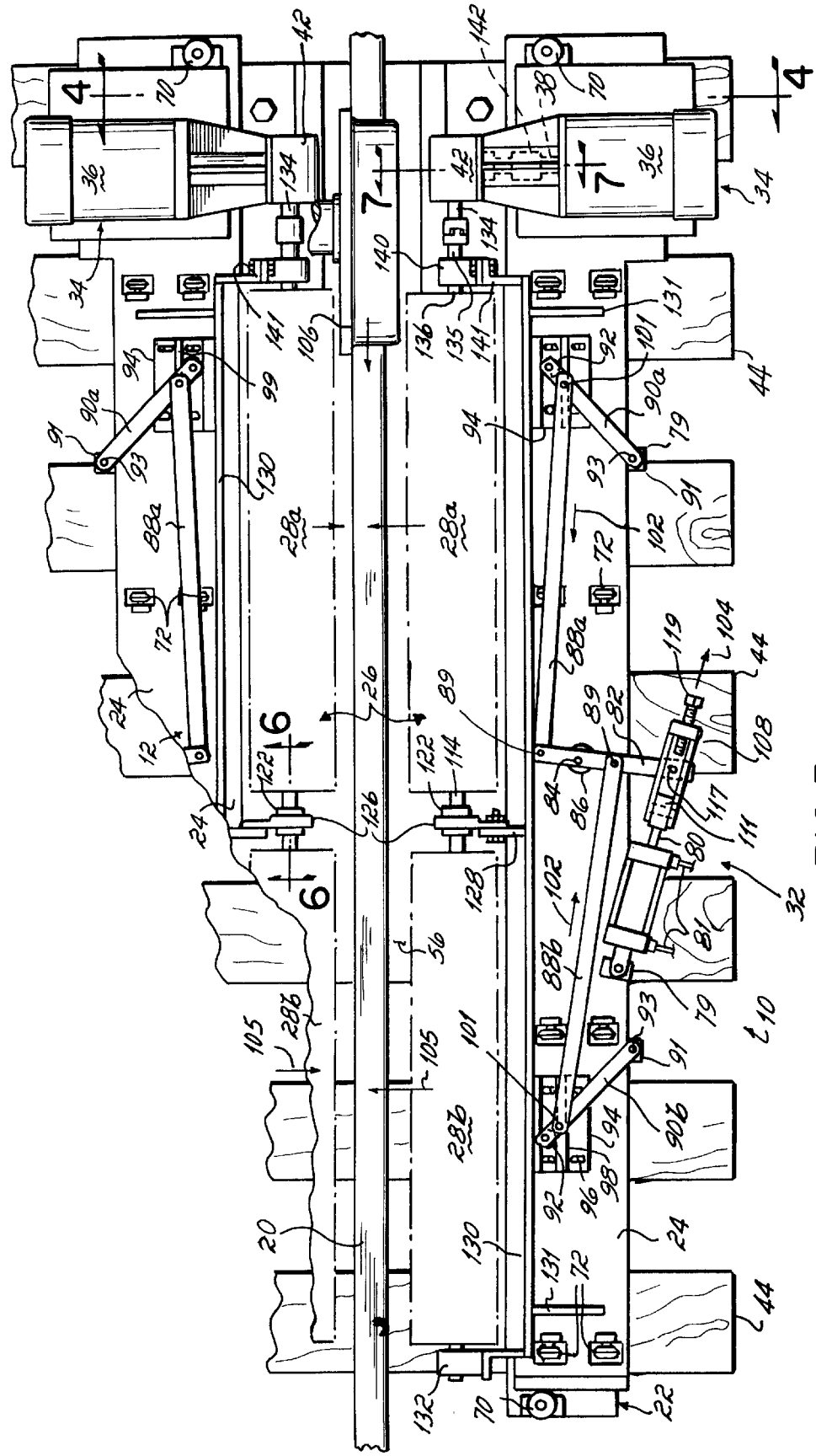
FIG. 3 is a top view of the system on either side of the rail.

The movable brush plate 24 on the stationary frame 22 of the present invention is moved by a linkage system 32 which comprises a plurality of arms and linkage arms coupled to an actuating mechanism or actuator. Moving plate 24 moves the brush mechanism 26 toward and away from rail 20. More specifically, the linkage system 32 includes an actuating mechanism 78 which may be a gas cylinder or electric linear actuator. One end of the actuating mechanism 78 is rigidly coupled to a base block 79 which is welded to plate 24 to secure one end of the actuating mechanism to plate 24. Actuating mechanism 78 includes a movable rod 80. Rod 80 is driven out of the housing or cylinder of mechanism 78 when it is actuated, to move the brushes 28a, 28b toward rail 20 (see FIG. 4), and is withdrawn or retracted to move the brushes away from the rail. FIGS. 2 and 3 illustrate rod 80 in the withdrawn or retracted position wherein the brush mechanism 26 is moved away from rail 20.

Coupled to rod 80 is the main pivot arm 82 which pivots at a pivot point formed by a pin 84 which is bushed to the main pivot arm 82 and is welded to a boss 86 which is, in turn, fixed to plate 24. A stroke clevis 108, discussed below, is coupled between rod 80 and pivot arm 82. Pin 84 is fixed with respect to plate 24, and the arm 82 pivots on the pin. Two linkage arms 88a, 88b extend from the main pivot arm 82. The ends of the linkage arms 88a, 88b which are coupled to the main pivot arm 82, pivot about pins 89, which are bushed to the linkage arms 88a, 88b and are securely fixed to the main pivot arm 82, such as by welding. In that way, the main pivot arm 82 pivots on fixed pin 84, while the linkage arms 88a and 88b pivot on fixed pins 89, which are fixed to the main pivot arm 82. For moving brush plate 24 when arm 82 pivots, the linkage arms 88a, 88b are coupled, in turn, to actuator arms 90a, 90b. One end of each actuator arm is pivotally mounted to blocks 91 which are fixed by welding to one of the elongated members 61b of the stationary frame 22. The respective ends of the actuator arms 98a, 98b have pins 93 welded thereto which are bushed to the blocks 91 for rotating with respect to the blocks. The linkage arms 88a, 88b are coupled to the actuator arms 90a, 90b through pins 101 which are fixed to the actuator arms 90a, 90b and are bushed with respect to the linkage arms 88a, 88b.

Actuating mechanism 78 is appropriately coupled to a source of pressurized air or electricity by lines 81 for the actuating mechanism and moving the rod 80. The other ends of the actuator arms 90a, 90b opposite the blocks 91 are coupled to rollers 92 which rotate on the ends of the actuator arms. The rollers 92 move within roller guides 94 that are appropriately bolted to plate 24. The roller guides 94 include slotted adjustment openings 96 which receive appropriate fasteners such as bolts (not shown) to fix the roller guides 94 to plate 24. The slotted openings 96 provide adjustment of the roller guides 94 so that when the linkage system 32 is actuated, the brush mechanism 26 is moved the proper distance toward and away from rail 20, and the brush plate and brushes remain generally parallel to rail 20. In that way, damage to the brush mechanism 26 is reduced while premature wear of the individual brushes 28a, 28b is also reduced. The position of the roller guides provides a fine adjustment to the position of the brush mechanism. The adjustable guides 94, in combination with the adjustable frame on the chair 14, creates proper brush wear for longer brush life.

Referring to FIGS. 1 and 3, the roller guides 94 include two parallel guide walls 98 which define a channel therebetween for movement of roller 92. Preferably, the guide walls 98 are spaced to be larger than the diameter of the roller 92 so that binding of the roller within the guide 94 is avoided. When the actuator arms 90a, 90b are pivoted about blocks 91 to move rollers 92 within the guides 94, a portion of each actuator arm overlies one of the guide walls 98 (see FIG. 3). To prevent wear of the guide wall by the arm 90a, 90b, a brass wear strip 99 is mounted on top of the guide wall 98 between the guide wall and the actuator arm 90a, 90b.

The linkage system 32 provides movement of the various linkage arms in opposite directions as illustrated by reference arrows 102 in FIG. 3. More specifically, when actuating mechanism 78 is actuated so that rod 80 moves in the direction of arrow 104, the main pivot arm 82 is pivoted around pin 84 to pull linkage arm 88a in one direction and linkage arm 88b in another, opposite direction. In that way, the respective actuator arms 90a, 90b are pivoted about pins 93 in the direction of arrows 102, so that the rollers 92 are moved within guides 94. This effectively increases the length of the actuator arms 90a, 90b between the blocks 91 and guides 94 and moves the guides and frame plate 24 in the direction of rail 20. Since the end of the actuator arms 90a, 90b pivoting on pins 93 are mounted to the blocks 91 fixed to stationary frame plate 22, the movable brush plate 24 which is bolted to the roller guides 94, is moved in the direction of rail 20, as illustrated by reference arrow 105.

In accordance with the principles of the present invention, linkage arms 88a, 88b are moved in opposite directions by actuation of piston 80 so that opposite driving forces are created on guides 94 by the rollers 92. In that way, the generally equal and opposite forces provide forward thrust of brush plate 24 in the direction of arrow 105 toward the rail 20, rather than side thrust against either of the guide rollers 70. In that way, the movable brush plate 24 is properly moved on the stationary frame plate 22 without detrimental amounts of side torque. The guide rollers 70 do not have to withstand a large amount of side force to properly guide the movable frame plate 24 with respect to the stationary frame plate 22.

As illustrated in FIG. 4, when rod 80 is in the withdrawn position, as shown in FIGS. 2 and 3, the brush plate 24 and the brush mechanism 26 are moved away from rail 20. When the rod 80 is extended, the brush mechanism 26 is moved so that the brushes contact the wheels 106 of a rail car moving along the rail 20 (FIG. 5). As mentioned hereinabove, for proper movement of the brush mechanism 26 against the rails, stationary frame plate 22 includes adjustment slots 64 thereon for positioning plate 22 on the various rail chairs 14,16. Furthermore, the roller guides 94 include adjustment slots 96 for adjusting their positioning with respect to plate 24 to further provide for adjustment and positioning of the brush mechanism 26 when it engages the rail, as shown in FIG. 5. To further provide for proper disengagement and engagement of the brush mechanism 26 by the linkage system 32 and adjustments for brush wear, a stroke clevis is coupled to rod 30 to engage the linkage system 32.

Figure 9:
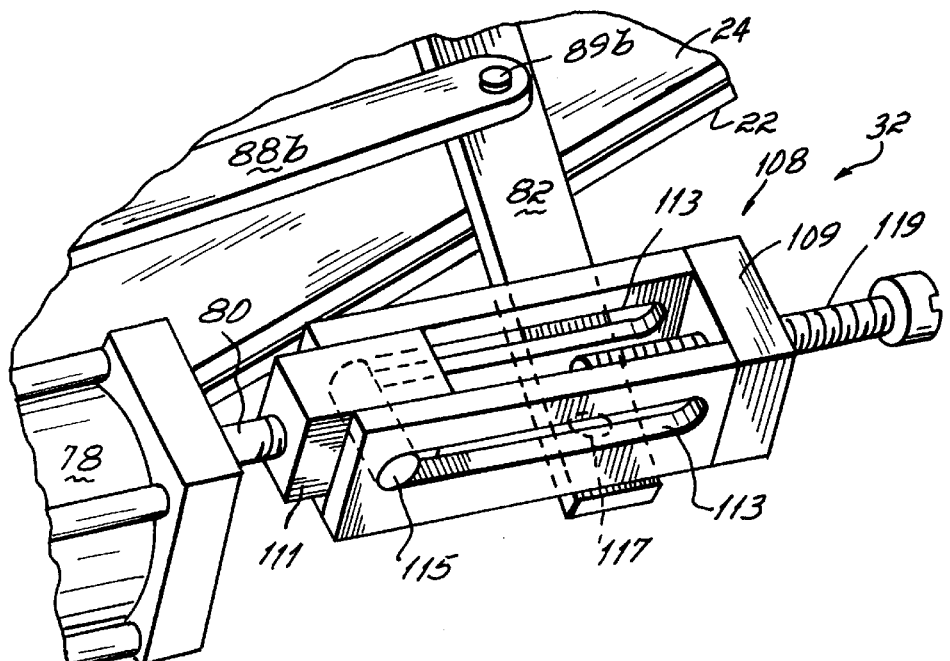
FIG. 9 is a perspective view of the stroke clevis of the invention.

Referring to FIG. 9, the stroke clevis 108 includes a housing 109 which is open at one end to receive block 111. Housing 109 includes slots 113 formed on both sides thereof. Block 111 has a guide pin 115 which extends therethrough and is rigidly secured to the block 111, such as with another pin (not shown). In that way, the block 111 and guide pin 115 move together as a unit. The guide pin 115 is configured for sliding in the slots 113 of the housing 109. Block 111 also includes a threaded opening for receiving a threaded end of the rod 80 to couple the stroke clevis 108 to the actuating mechanism. Pivot arm 82 is rotatably coupled to housing 109 through a pivot pin 117 which is attached to housing 109, such as by welding. Pivot arm 82 thus pivots about pin 117 when rod 80 is extended and retracted to move the brush mechanism.

In accordance with one aspect of the present invention, the stroke clevis 108 includes a motion limiting bolt 119 which is threaded into the end of housing 109 opposite block 111. The motion limiting bolt 119 determines the length of the stroke of rod 80 before the pivot arm 82 is moved. As shown in FIG. 9, rod 80 may be extended to push block 111 through housing 109 for a predetermined distance before bolt 119 is engaged. Block 111 and guide 115 will slide through the housing 109 and adjustment slots 113, respectively, for a certain distance before the housing 109 is moved to pivot arm 82. When block 111 strikes bolt 119, which is threaded into the housing 109, the housing will begin to move to thus pivot arm 82. In that way, the stroke of rod 80 of the actuating mechanism, which causes movement of the brush mechanism, may be adjusted in accordance with the principles of the present invention. By moving the bolt 119 inwardly or outwardly with respect to the housing 109, the effective travel distance of rod 80 is limited. Until the rod and block 111 contact the bolt 119, there will be no brush plate movement. The combination of the stroke clevis and adjustment slots 96 and 64, the rods for various adjustment to the brush movement of the system to thus provide proper cleaning and reduce premature brush wear. While the slots 64 and 96 would generally be utilized in construction of the system to provide for proper alignment of the brush mechanism with the rail, stroke clevis 108 may be utilized to provide maintenance adjustment of the movement of the brush plate 24 to counteract brush wear. As the brushes wear, it will be necessary to move the brush plate closer and closer to rail 20 to provide for brush contact with the rail. By adjusting the travel distance of the rod 80 with stroke clevis 108, such fine tuning and adjustments may be obtained.

Brush Mechanism

The brush mechanism 26 of the present invention, used to clean the rail car wheels, utilizes two pair of rotating brushes, one pair on either side of rail 20. As with the other mechanisms and subsystems of the invention, the brush mechanism will be described for one side of one rail. The mechanism is essentially duplicated on the other side of the rail, and the entire four-brush mechanism is duplicated for each rail.

Figure 6:
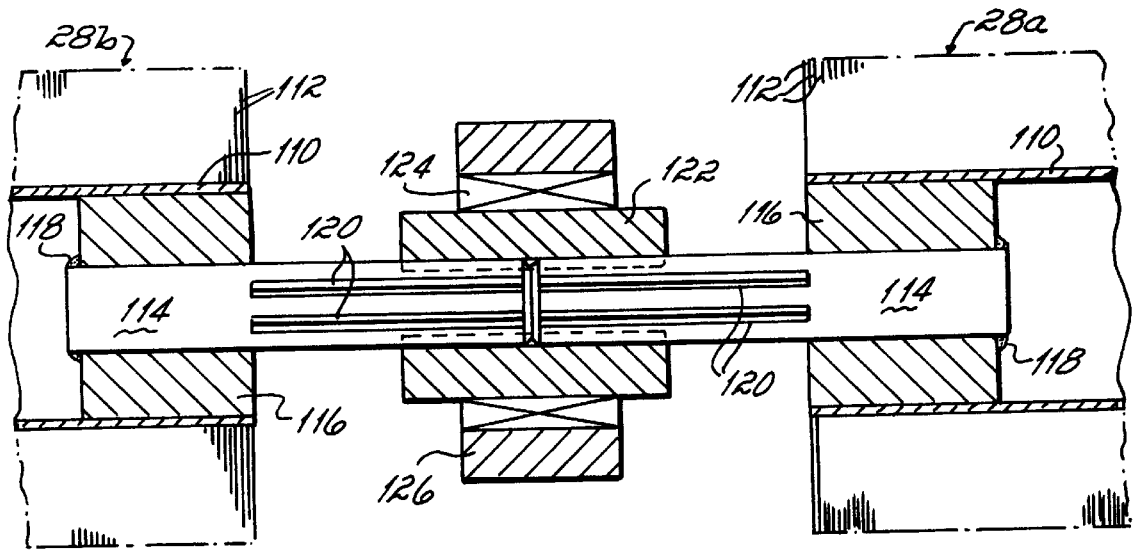
FIG. 6 is a cross-sectional view along lines 6—6 of FIG. 3.
Figure 7:
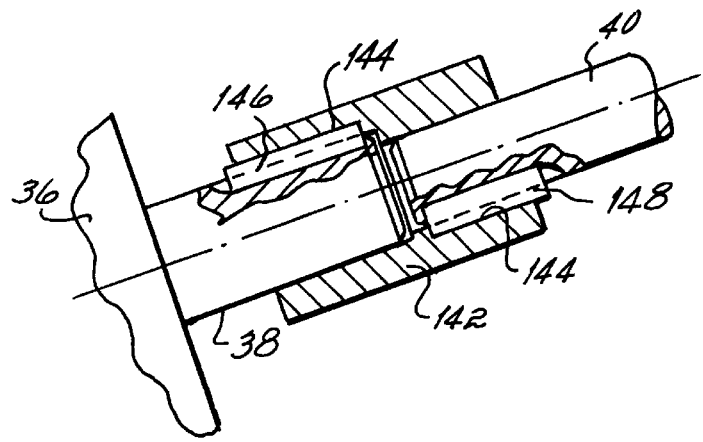
FIG. 7 is a cross-sectional view along lines 7—7 of FIG. 3.

Referring to FIG. 3, brush mechanism 26 includes two elongated brushes 28a, 28b which are mounted coaxially to rotate on an axis 30 extending generally parallel to rail 20. Referring to FIG. 6, the brushes 28a, 28b are formed of a hollow steel cylinder 110 having bristles 112 wrapped therearound. The bristles may be formed of, but are not limited to, a nylon material such as 0.040 nylon with No. 80 grit, which is rigid and durable and suited for cleaning the hard steel of a railcar wheel 106. In one embodiment, the brushes are preferably around 7½" in diameter and 55 inches long. A stainless steel shaft 114 is coupled to a bushing 116 such as by a weld 118. The bushing 116 is then press fit into the end of cylinder 110. Shaft 114 has a plurality of splines 120 positioned circumferentially therearound. The shaft 114 of each of the brushes 28a, 28b is press fit into a similarly splined sleeve 122 formed of brass. In that way, the individual brushes 28a, 28b are coupled together, as shown in FIG. 6, to be rotated simultaneously when the free end of one of the brushes, such as brush 28a, is driven by the drive mechanism 34 of the present invention. Sleeve 122 is mounted within a bearing 124 for rotational movement. Bearing 124, in turn, is held in place by a bracket 126, which is rigidly mounted to the movable brush plate 24. More specifically, bracket 126 is mounted to a flange 128, such as by bolts, and the flange is mounted to a mounting plate 130 which is welded to brush plate 24. Mounting plate 130, as illustrated in FIGS. 2 and 3, extends generally perpendicular to the plane of brush plate 24 and it is held in place by brackets 131 welded to the mounting plate 130 and the brush plate 24. The free end of brush 28b, opposite sleeve 122 and bearing 124 is rotatably mounted within another bracket 132 which is rigidly fixed, such as by welding, to mounting plate 130. Bracket 132 also contains a bearing (not shown) which couples with the end of the brush for smooth rotation thereof. The other free end of brush 28a, opposite bearing 124, is coupled to the drive mechanism 34 of the invention, as described further hereinbelow.

In accordance with another aspect of the invention, the individual brushes, 28a and 28b are mounted on separate shafts and can be individually removed and replaced in the brush mechanism 26 without affecting the other brush or bearing 124. Bearing 124 is a solid bearing to ensure proper alignment of the brushes with rail 20 and to prevent shifting of the brushes during use. To remove a brush, such as brush 28b, the end bracket 132 is removed and brush 28b may simply be slid or pulled from sleeve 122. Brush 28a will remain in place. In the prior art cleaning system, the brushes were coupled together through a unitary shaft. When it was desirable to replace one of the brushes, it became necessary to remove the entire shaft. However, such removal was virtually impossible, and thus the shaft would generally have to be cut in half, such as with a torch or saw, thus requiring replacement of the entire assembly. Since replacement brushes are very expensive, such a feature in the prior art was undesirable. The present invention addresses that drawback and presents a system which may be easily and relatively inexpensively maintained, as compared to the prior art systems. The individual brushes 28a and 28b may be removed and a new brush installed without affecting the other of the brushes. In that way, maintenance costs are reduced.

Drive Mechanism

Figure 8:
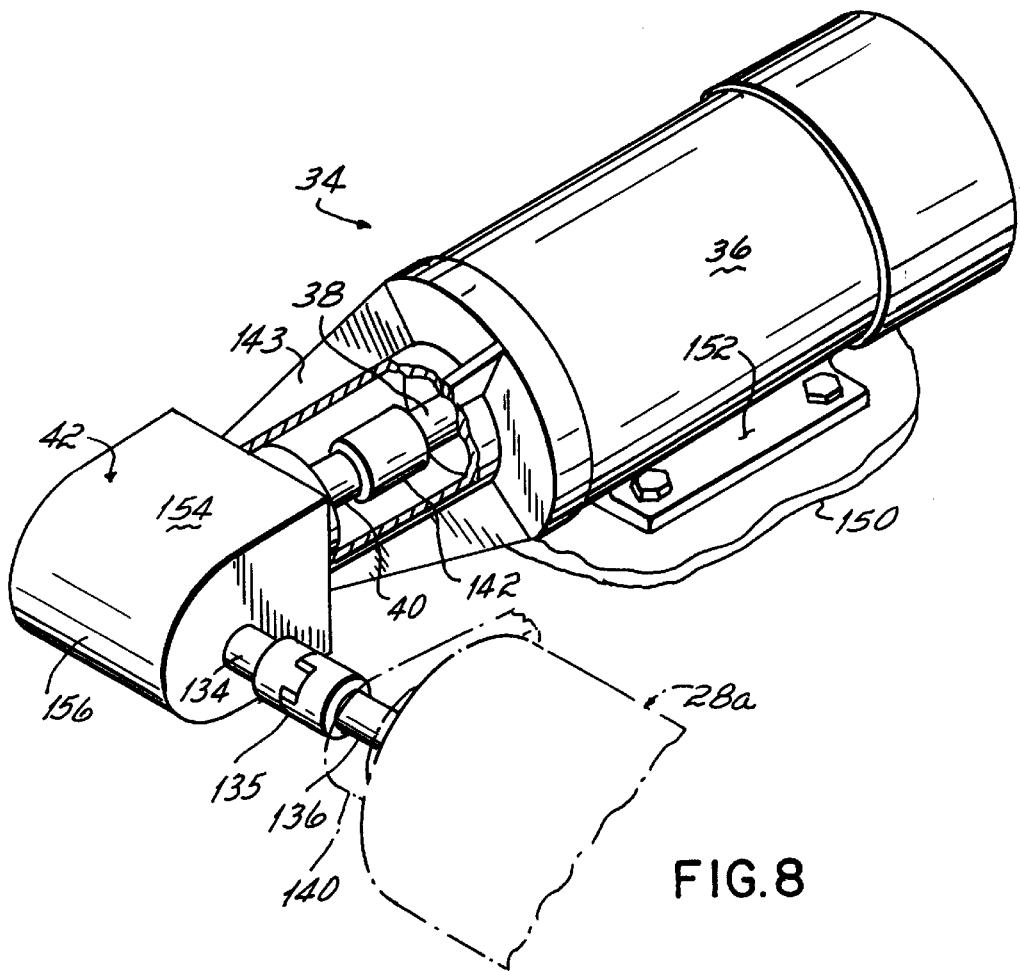
FIG. 8 is a perspective view of a portion of the drive mechanism of the invention.

The drive mechanism 34 is mounted at one end of the movable frame plate 24 and is operable to rotate the brushes 28a, 28b when they are moved against rail 20. Referring to FIGS. 3 and 8, the drive mechanism 34 includes a motor 36 coupled to a drive shaft 38. Driven shaft 40 is coupled to a gear reducer/coupler 42. The output shaft 134 from the gear reducer 42 has a key slot (not shown) as does the free end shaft of 136 of brush 28a (see FIG. 8). Shafts 136 and 134 are coupled together by a keyed coupling sleeve 135. Shaft 136 extends through a solid bearing 145 in a bracket 140 bolted to a flange 141 fixed to the mounting plate 130, such as by welding (FIG. 3 and 8). Motor 36 is a 10 horsepower AC motor for driving the drive shaft 38 up to 1800 rpm. Coupling 135 is an elastomeric coupling, such as might be available from Lovejoy, Inc. in Downers Grove, Ill.

In accordance with another aspect of the present invention, drive shaft 38 is coupled to driven shaft 40 by a solid coupling 142 which effectively locks the drive shaft 38 and driven shaft 40 together in precise alignment. The drive shaft 38 and driven shaft 40 of the invention are held in precise alignment without routine maintenance or realignment. Thus, installation is made easier and maintenance costs are reduced. The angular alignment between the drive shaft and driven shaft is important, as misalignment will cause premature wear. In the prior art system, the alignment between the drive shaft and driven shaft was provided by a flexible coupling which had to be very precisely aligned during installation to ensure proper wear. The precision alignment is somewhat tedious and thus was often ignored. The lack of attention paid to such alignment and the harsh environment of the railroad contributed to premature failure of the coupling requiring frequent and expensive repairs and replacement.

Reducing such repairs and providing easier installation with less requirement for proper alignment for the installer, coupling 142 is a solid block of steel which has appropriate key slots formed therein. Drive shaft 38 from motor 36 has a slot which includes a key 146 which fits into one of the key slots 144, while the driven shaft 40 which extends to the gear reducer has a slot and includes another key 148 which fits into another key slot 144. In that way, the drive shaft 38 and driven shaft 40 are solidly locked together without need for further alignment. Installation of the drive mechanism is made easier while expensive repairs and maintenance are reduced.

To protect drive shaft 38, driven shaft 40 and the solid coupling 142, a flange adapter 143 is connected between the motor 36 and coupler 42. The flange adapter 143 surrounds the solid coupling 142 and thus prevents damage thereto so that power may be properly transferred to coupler 42 and ultimately to the brushes.

Gear reducer/coupler 42 provides a 2:1 gear reduction between motor 36 and output shaft 134 which is coupled to the brushes 28a and 28b. Preferably, motor 36 will produce a brush speed of approximately 900 rpm.

Referring to FIGS. 4 and 5, in accordance with another aspect of the present invention, the gear reducer/coupler 42 reduces interference with rail 20 and railcar wheels 26 moving thereon to thereby reduce damage to the drive mechanism and the cleaning system 10 of the invention. Furthermore, the coupler 42 maintains the three inch limit over the top rail surface to prevent damage to the system. Gear reducer/coupler 42 provides a 90° coupling between driven shaft 40 and the output shaft 134 so that motor 36 can be positioned generally perpendicular to rail 20. In that way, motor 36 is maintained out of the way with respect to rail 20 and wheels 106 thereon. Furthermore, the length of the overall system 10 along the track is further reduced. As shown in FIG. 2, the length of motor 36 is supported by the wider portion 76 of brush plate 24. Motor 36 is mounted to the brush plate 24 on a special mounting plate 150. A frame portion 152 of the motor 36 is bolted or otherwise fixed to plate 150 for securing the motor 36 to the movable brush plate 24.

Turning now to gear reducer/coupler 42, the coupler includes a housing 154 having a side wall surface 156 facing rail 20. Side wall 156 is rounded or curved to prevent interference between the gear reducer, rail 20, and any wheels 106 rolling thereon (FIG. 5). Furthermore, the curved side wall 156 of gear reducer 42 reduces and prevents interference with portions of the train moving on rail 20, such as the wheel flange and edge of the wheel. When brush plate 24 is moved toward rail 20 to engage wheels 106 with the brushes 28a, 28b the entire drive mechanism also moves closer to the rail. The curved side wall 156 of the gear reducer 42 as illustrated in FIG. 5 has a radius less than the effective radius of the brushes 28a, 28b and thus reduces and eliminates interference between the gear reducer/coupler 42 and wheels 106, even when the brushes contact the wheels 106 (see FIG. 5). In one embodiment, the brushes have an original radius of 3¾" while the curved wall has a 2¼" radius. This provides approximately 1½" of brush wear before the brush matches the radius of the coupler. In that way, the range of movement of the brush mechanism of the present invention may be adjusted for adequate cleaning of the wheels 106 without interference with solid elements of the drive mechanism. Furthermore, the curved side wall 156 of gear reducer 42 prevents interference of the system 10 with wider portions of the rail cars. Gear reducer/coupler 42 is bolted to the motor by means of adapter 143 further reducing any alignment problems by providing solid coupling between the motor 36 and coupler 42.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

What is claimed is:

1. A system for cleaning the wheels of railcars as the railcars move along the rails of a railroad track comprising:

a chair for supporting a track rail;

a movable frame plate movably mounted with respect to said chair to be alternately movable toward and away from said track rail supported by the chair;

a brush mounted for moving with the frame plate toward and away from the rail to clean railcar wheels moving along the rail;

a linkage system operably coupled between said frame plate and said chair for moving the frame plate and brush with respect to the rail on the chair, the linkage system comprising:

a first actuator arm pivotally mounted with respect to said chair and coupled to the movable frame plate, the first actuator arm operable for pivoting in a first direction and directing the frame plate and brush toward the rail;

a second actuator arm pivotally mounted with respect to said chair and coupled to the movable frame plate, the second actuator arm operable for pivoting in a second direction opposite to the first direction and directing the frame plate and brush toward the rail;

an actuating mechanism for simultaneously pivoting both of said actuator arms so that the arms simultaneously direct the brush toward the rail to clean wheels thereon;

whereby the brush is directed against the rail by opposing forces to reduce the shifting of the brush in a direction other than toward or away from the track rail.

2. The wheel cleaning system of claim 1 wherein said linkage system further comprises a pivot arm pivotally coupled with said movable frame plate at a pivot point, the center link being pivoted by said actuating mechanism;

the pivot arm operably coupled with the actuator arms for simultaneously pivoting said outer links in said respective first and second directions when the center link is pivoted.

3. The wheel cleaning system of claim 1 wherein said linkage system further includes linkage arms for coupling the pivot arm to the actuator arms for simultaneously pivoting the actuator arms.

4. The wheel cleaning system of claim 1 wherein said actuating mechanism includes a cylinder having an actuatable piston coupled to said linkage system for moving the linkage system to move the frame plate and brush.

5. The wheel cleaning system of claim 1 further comprising a stationary frame plate coupled to the chair, the movable frame plate being movably mounted on the stationary frame plate for moving toward and away from the rail.

6. The wheel cleaning system of claim 5 wherein said stationary frame plate includes an adjustable member for adjusting the position of the stationary frame plate on the chair and with respect to the rail.

7. The wheel cleaning system of claim 6 further comprising rollers coupled to said movable frame plate, the rollers moving on said stationary frame plate for moving the movable frame plate thereon.

8. A system for cleaning the wheels of railcars as the railcars move along the rail of a railroad track comprising:
   a chair for supporting a track rail;
   a brush mechanism movably mounted with respect to said chair and configured to be mounted on a side of said rail for moving toward and away from the rail to clean railcar wheels moving along the rail, the brush mechanism comprising:
      at least two elongated brushes oriented to extend generally end to end with each other, the elongated brushes rotatable on an axis generally parallel to a rail placed on said chair;
      the brushes having first and second ends, the first ends of said elongated brushes being rotatably mounted in an end bearing;
      a sleeve having a center bore therethrough, second ends of said brushes mounted in said sleeve bore for being simultaneously rotatable when said sleeve is rotated, each of said brush second ends being removable from said sleeve independently from said other brush second end for replacement of individual brushes in the brush mechanism;
      a center bearing configured for receiving the sleeve to rotate the sleeve and brushes.

9. The wheel cleaning system of claim 8 wherein said second ends of said brushes include splines, the sleeve including cooperating splines for engaging the brush end splines to mount the brush second ends in the sleeve.

10. The wheel cleaning system of claim 8 wherein the brushes include a hollow core and bristles wrapped around the core.

11. A system for cleaning the wheels of railcars as the railcars move along the rail of a railroad track comprising:
   a structure for supporting a track rail;
   a brush mechanism configured to be movably mounted on a side of said structure and operable for moving toward and away from a rail on the structure to clean railcar wheels moving along the rail, the brush mechanism comprising at least one elongated brush which is rotatable to clean a wheel on a rail;
   a drive mechanism operably coupled to the brush mechanism for rotating the brush;
   the drive mechanism including a rotating drive shaft and a rotating driven shaft, the rotating driven shaft being coupled to the brush for rotating the brush;
   a solid coupling sleeve engaging an end of said drive shaft and engaging an end of the driven shaft, the coupling sleeve rigidly securing the drive shaft and driven shaft together for rotating the brush with the drive mechanism;
   whereby alignment of the drive shaft and driven shaft is rigidly set to prevent improper wear in the system.

12. The wheel cleaning system of claim 11 wherein said drive shaft includes a key, the coupling sleeve having a key slot therein for receiving said drive shaft key and securing the drive shaft thereto.

13. The wheel cleaning system of claim 11 wherein said driven shaft includes a key, the coupling sleeve having a key slot therein for receiving said driven shaft key and securing the driven shaft thereto.

14. The wheel cleaning system of claim 11 wherein said driven axis is oriented generally perpendicular to a rotational axis of said brush, the drive mechanism further comprising a coupler for coupling said brush and said driven shaft such that rotation of said driven shaft creates rotation of said brush.

15. The wheel cleaning system of claim 14 wherein said brush has an outer diameter sufficient to engage a railcar wheel on a rail when the brush mechanism is moved toward the rail on the structure, the coupler oriented generally in line with the rotational axis of the brush and having a housing with a side wall facing the rail when the brush is moved toward the rail, the side wall being curved and having an effective outer diameter less than the brush outer diameter to prevent interference with a wheel being cleaned and damage to the drive mechanism.

* * * * *